US012655679B2

(12) United States Patent
Slagter et al.

(10) Patent No.: US 12,655,679 B2
(45) Date of Patent: Jun. 16, 2026

(54) WINDOW ENERGY MANAGEMENT SYSTEM WITH ENHANCED FORCE PROTECTION

(71) Applicants: John Thomas Slagter, Grand Rapids, MI (US); Timothy Dykhuis, Grand Rapids, MI (US)

(72) Inventors: John Thomas Slagter, Grand Rapids, MI (US); Timothy Dykhuis, Grand Rapids, MI (US)

(73) Assignee: The Mackinac Technology Company, Kentwood, MI (US)

(*) Notice: Subject to any disclaimer, the term of this patent is extended or adjusted under 35 U.S.C. 154(b) by 111 days.

(21) Appl. No.: 17/876,999

(22) Filed: Jul. 29, 2022

(65) Prior Publication Data

US 2023/0084137 A1 Mar. 16, 2023

Related U.S. Application Data

(60) Provisional application No. 63/227,994, filed on Jul. 30, 2021.

(51) Int. Cl.

| | |
|---|---|
| ***E06B 5/12*** | (2006.01) |
| ***E04H 9/06*** | (2006.01) |
| ***F42D 5/045*** | (2006.01) |

(52) U.S. Cl.

CPC ................. *E06B 5/12* (2013.01); *E04H 9/06* (2013.01); *F42D 5/045* (2013.01)

(58) Field of Classification Search

CPC .............. E06B 5/12; E04H 9/06; F24D 5/045
See application file for complete search history.

(56) References Cited

U.S. PATENT DOCUMENTS

| | | | | |
|---|---|---|---|---|
| 4,276,725 A * | 7/1981 | Ash | E04B 1/98 52/167.9 |
| 4,347,796 A * | 9/1982 | King | F42B 39/14 89/36.01 |
| 4,372,082 A * | 2/1983 | Pagel | E06B 3/28 49/505 |
| 6,502,355 B1 * | 1/2003 | Bori | E06B 9/02 248/363 |
| 7,174,692 B1 * | 2/2007 | Vickers | E06B 5/125 52/204.593 |

(Continued)

FOREIGN PATENT DOCUMENTS

| | | | |
|---|---|---|---|
| DE | 4315759 C1 * | 5/1994 | E04B 1/8209 |
| WO | WO-2014081653 A1 * | 5/2014 | B32B 17/064 |

*Primary Examiner* — Theodore V Adamos
(74) *Attorney, Agent, or Firm* — Rohm & Monsanto, PLC

(57) ABSTRACT

A blast-resistant retrofit window insulation system has panes of low-e coated polymer film, such as TPU or ETFE, held in a rigid frame to form a pane assembly. One or more pane assemblies are stacked to make a multilayer unit, or are mounted in a robust polymer casing, that is sized to fit the window frames of an existing building window or to attach to the wall of the building surrounding the window. The polymer film(s) can absorb energy of a blast without breaking provided that the collective thickness of the film(s) is at least 20 mil, and preferably 24 mil or more. The polymer film pane assemblies, when securely bolted to the structural components of the building around the window, have a remarkable ability to absorb blast energy and mitigate secondary debris hazards.

21 Claims, 7 Drawing Sheets

(56) References Cited

U.S. PATENT DOCUMENTS

| | | | | |
|---|---|---|---|---|
| 2004/0226231 | A1* | 11/2004 | Dlubak | B32B 17/10036 52/204.5 |
| 2006/0032160 | A1* | 2/2006 | Gazaway | E06B 5/12 160/172 R |
| 2013/0047524 | A1* | 2/2013 | Sayer | G21F 7/03 52/171.1 |
| 2014/0326126 | A1* | 11/2014 | Hay, III | E06B 5/10 89/36.04 |
| 2015/0090411 | A1* | 4/2015 | Pyles | E06B 9/24 160/368.1 |
| 2016/0145934 | A1* | 5/2016 | Trott | E06B 3/26 52/203 |
| 2016/0279904 | A1* | 9/2016 | Sienerth | B32B 17/10788 |
| 2018/0117881 | A1* | 5/2018 | Pyles | B32B 7/12 |
| 2018/0272660 | A1* | 9/2018 | Aoki | B32B 17/10761 |

* cited by examiner

WINDOW ENERGY MANAGEMENT SYSTEM WITH ENHANCED FORCE PROTECTION

RELATIONSHIP TO OTHER APPLICATION(S)

This application claims the benefit of the filing date of U.S. Provisional Patent Application Ser. No. 63/227,994 filed Jul. 30, 2021, Conf. No. 5006 (Foreign Filing License Granted). The disclosure in the identified United States Provisional Patent Application is incorporated herein by reference.

GOVERNMENT RIGHTS

This invention was made with Government support under Grant/Contract Number W9132T19C0001 awarded by the US Department of Defense (Engineer Research and Development Center). The Government has certain rights in this invention.

BACKGROUND OF THE INVENTION

Field of the Invention

This invention relates generally to a retrofit window insulation system, and more particularly to a blast-resistant window attachment comprising one or more transparent polymer films held in a rigid frame.

Description of Related Art

Windows cover about 10-20% of the exterior envelope of a commercial building. The relative flow of energy through the windows represents 60-80% of the heating and cooling energy losses. The economic impact of energy loss through windows is astounding. As an example, the Department of Defense (DoD) operates 2.2 billion square feet of facility space with an annual utility bill of $4.01 billion. As a result, the DoD plans to make energy conservation a directed requirement. Consequently, there is a need for energy efficient building construction components, such as windows, and more particularly retrofittable window insulation systems, to improve the efficiency of older buildings.

The Mackinac Technology Company, Grand Rapids, MI, has developed an energy efficient retrofit window insulation system, to be sold under the trademark WEMS, that addresses energy loss sustained through a building's windows. In one embodiment, the WEMS™ retrofit window insulation system (herein designated WEMS unit) is installed behind an existing window on the interior of a building. The WEMS units were designed to provide optimal energy performance while still maintaining the aesthetic appeal of the existing windows. Advantageously, the WEMS units have the ability to transmit at least 90% visible light with low haze. The Mackinac Technology Company estimates that the WEMS units can reduce window energy losses from the typical 60-80% to about 10-25%. This has the potential to reduce total building energy usage by 10% on the average.

In addition to energy conservation, there is increasing interest in minimizing human injury, loss of life, and structural and property damage in the event of an explosive attack. While the primary cause of death in an explosion is typically related to structural collapse, the secondary cause of injuries and death is fragmentation which is defined as high-velocity debris originating from pieces of walls, windows, light fixtures, equipment, and furniture. Primary debris hazards are defined as fragments that originate from the housing or materials in direct contact with the explosive or munition. The fragments created during the blast event originating from the building itself are defined as secondary debris hazards. As an example, the Khobar Towers in Dhahran, Saudi Arabia were attacked in 1996 with a large truck bomb. In this event, there were 19 fatalities, and 58 people were hospitalized primarily from glass fragment injuries as debris from materials in the building structure impacted the interior walls.

As a result, the DoD is seeking a retrofit window insulation system that does not introduce any new secondary debris hazards to the occupants of the building. This means that none of the components of the retrofit window insulation system can become a secondary debris hazard in a blast event. These components include, for example, the casing structure, the film panes, and mechanical connection materials from the unit frame or wall surround, of the retrofit system. If the panes of film in the retrofit unit open or tear to allow building window fragments to enter the facility, the retrofit unit will still be considered for use by the DoD provided that none of the components of the retrofit unit itself become secondary debris.

It is, therefore, an object of this invention to provide a retrofit window insulation system that does not introduce any new secondary debris hazards in the event of an explosion. It would be particularly desirable for the retrofit window insulation system to provide secondary debris mitigation, that is, to provide protection against secondary debris generated from the building window fragments from a blast event.

SUMMARY OF THE INVENTION

The foregoing and other objects are achieved by this invention which provides a window insulation system with enhanced force protection that can be retrofit onto the interior of an existing window frame or attached to the wall surrounding the existing window frame.

The basic unit of the blast-resistant retrofit window insulation system of the present invention is a pane assembly. The pane assembly has at least one transparent polymer film which is bonded to a rigid frame structure. The polymer film, which in the illustrative embodiments discussed herein, consists of thermoplastic polyurethane (TPU) or a copolymer of ethylene and tetrafluoroethylene (ETFE), can be commercially procured.

Preferred polymer substrate materials have thicknesses that range from 5 mils to greater than 20 mils and are flame resistant with low haze (<1%). The polymer film is adhered to the rigid frame by bonding the film to the frame, illustratively with an adhesive. A suitable low-emissivity coating must be applied to the polymer film substrate to achieve the desired energy performance. As used herein, the term "low-e polymer film" refers to the coated polymer.

The rigid frame structure is configured to custom fit the existing building structure which typically is the interior frame of a pre-existing window or the surrounding wall. The rigid frame structure may be a high strength polymer, illustratively pultruded fiberglass, and preferably metal, such as stainless steel. In particularly preferred embodiments the rigid frame structure is roll-formed stainless steel. Typically, the frame would be rectangular to match existing architecture and have four frame profile sections that have a front and back surface and which are configured, as will be described in more detail below, to advantageously provides an air gap between adjacent film surfaces in certain embodiments.

Each pane assembly holds one or two polymer films. In embodiments where the frame holds two films, one film is bonded on each side of the rigid frame which separates the two films to form an air gap. If more than two films are desired, more than one pane assembly can be stacked together and secured. The profile of the rigid frame forms an air gap between adjacent films in adjacent pane assemblies. Of course, spacers, such as wood blocks or foam, well-known to those in the industry, can be inserted between adjacent rigid frames to increase the gap to the desired width.

The rigid frame of the pane assembly (or assemblies) can be attached directly to existing structure in any manner known to those of skill in the art such as by press fit or preferably by releasable or permanent fasteners. Of course, blast-resistant embodiments require secure fastening. In an illustrative embodiment, holes can be drilled through the front surface of the frame so that the frame, or frames, can be fastened to the pre-existing structure with bolts or any other known fastening means.

In order to have acceptable blast-resistance, we have found that the polymer film (or films) in the pane assembly, or multiple pane assemblies, must have a collective thickness of greater than 20 mils, and preferably at least 24 mils, and more preferably as high as 50 to 60 mils or more. Retrofit window insulation systems comprising multiple films provide greater cut resistance, while thicker films increase the film strength against tears. Layers of film can be added to increase force protection and energy performance. As demonstrated in the experiments presented below, a collective film thickness of 20 mils has been proven to be sufficient for lower threat levels. Thinner and thicker films can be mixed in a pane assembly or casing and still provide adequate force protection at higher threat levels provided the collective thickness exceeds 20 mils.

In some embodiments, the polymer film is perforated with small holes for pressure equalization and to facilitate do-no-harm force protection by controlling the position of a tear in the film in the event of a blast as will be described in more detail below.

The number of polymer films comprising the retrofit window insulation system can also be compounded by adding multiple pane assemblies in a casing structure, such as the casing structure shown in FIG. 2. Grooves in the casing structure are configured to hold the pane assembly (ies) in place, and in some embodiments, to separate the pane assemblies to achieve the desired air gap between adjacent films/pane assemblies.

The casing structure, which may hold one or more pane assemblies in a robust casing, illustratively is made of a high strength polymer, such as Acrylonitrile Butadiene Styrene (ABS) which has strong impact resistance and is heat- and scratch-resistant. Other known polymers, such as poly vinyl chloride (PVC) or vinyl, well-known in the industry, are within the contemplation of the invention. In an alternative embodiment, the casing is made of metal, such as roll-formed stainless steel.

The casing which, in a typical embodiment, has a rectangular shape comprising a top horizontal header, connected to a lower horizontal support by two vertical side supports. Channels on the interior-facing surface of the casing receive and hold one or more pane assemblies. The overall dimensions of the casing are custom sized to fit on, or in, an existing window frame or to attach to the wall surrounding a pre-existing window. The header, in some cases, is available to hold additional elements of a decorative or a functional nature, such as a roller shade or louvers.

BRIEF DESCRIPTION OF THE DRAWING

Comprehension of the invention is facilitated by reading the following detailed description, in conjunction with the annexed drawing, in which.

DETAILED DESCRIPTION

I. Retrofit Window Insulation System

The two primary embodiments of the retrofit window insulation system 10, 10' of the present invention are the pane assembly 20 (FIG. 1) and the casing structure 30 (FIG. 2) which is configured to hold one or more pane assemblies.

Figure 1:
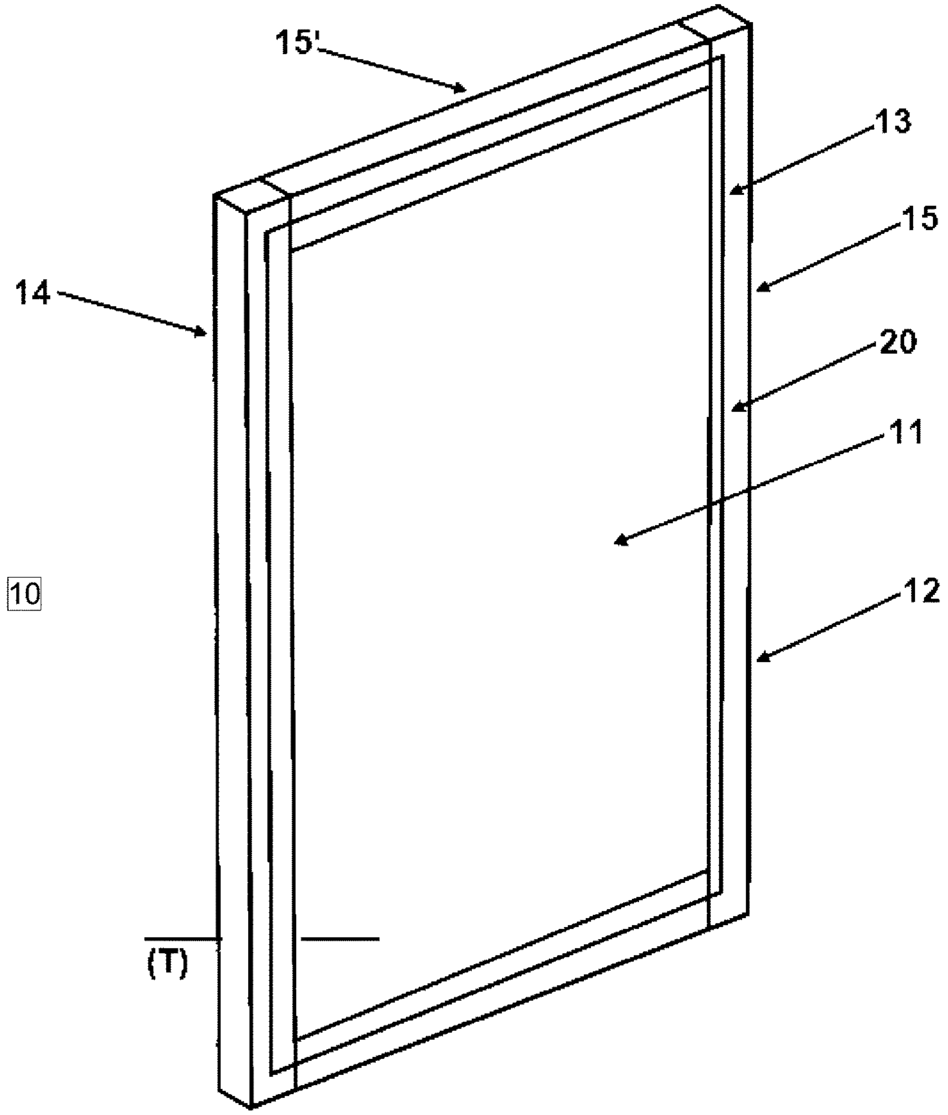
FIG. 1 is a schematic representation perspective view of a pane assembly for a retrofit window insulation system in accordance with the present invention.

Referring to FIG. 1, each pane assembly 20 consists, at minimum, of a polymer film 11 bonded to the front-facing surface 13 of a rigid frame 12. Rigid frame 12 can be formed of a high strength polymer, illustratively pultruded fiberglass. In an alternative, and preferred embodiment, the frame structure is made of metal, such as stainless steel. The stainless-steel frames and casings can be made with a press brake. In other preferred embodiments, stock stainless steel tubing or custom roll-formed profiles may be used.

In a typical embodiment, the rigid frame 12 has two pairs of frame profile sections 15, 15' of unequal lengths that form a rectangle. The frame profile sections have a front-facing surface 13 and back-facing surface 14 and a thickness (t) as measured front to back. Rigid frame 20 is sized to fit within casing structure 30 (see, FIG. 2) or to be directly attached to a pre-existing window frame or surrounding wall.

In some embodiments, a second polymer film (not shown) is bonded to the rear-facing surface 14 of rigid frame 12. The thickness (t) of rigid frame 12 advantageously separates the two films to form an air gap. If more than two films are desired, more than one pane assembly 20 can be stacked and fastened together. Again, the thicknesses of the rigid frames form an air gap between the films in adjacent pane assemblies. For optimal thermal performance, the preferred air gap width is between about 19 mm to 23 mm, and most preferably about 21 mm.

The polymer film(s) used in the pane assemblies of the present invention are transparent and provide a substrate for the deposition of a low emissivity (low-e) coating. In certain preferred embodiments, polymer film 11 is TPU with an added a low-e coating that is highly reflective to infrared heat energy but is transparent to visible light. TPU is available from a commercial supplier, which in the specific illustrative embodiment reported herein, is Huntsman Corporation, KRYSTALGRAN® PE501-200 DP TPU, and which was extruded to form a films of 2- and 10-mil thicknesses which were used in the experiments discussed hereinbelow.

Another polymer film that can be used in the practice of the invention is ETFE which is a copolymer of ethylene and tetrafluoroethylene commonly used in architectural applications and which is also available commercially. In the specific illustrative embodiments presented hereinbelow, the fluoropolymer film was obtained from Saint-Gobain Performance Plastics under its mark Chemfilm ETFE-E2 in 2- and 10-mil thicknesses. In one advantageous embodiment, the Saint-Gobain ETFE film had a proprietary "C-treatment" on one side to facilitate adhesion of the film to the rigid frame.

In specific illustrative embodiments reported herein, TPU films were bonded to fiberglass frames with a UV-curing adhesive. In preferred embodiments, ETFE films were bonded to the frame, which may be a roll-formed stainless steel, with 3M brand VHB double-sided tape.

Another example of an ETFE film that is suitable for use in the practice of the present invention is disclosed in co-pending international patent application number PCT/US21/43343, assigned to the Assignee hereof, and laid-open on Dec. 23, 2022 as International Publication No. 2021/258083.

Figure 3:
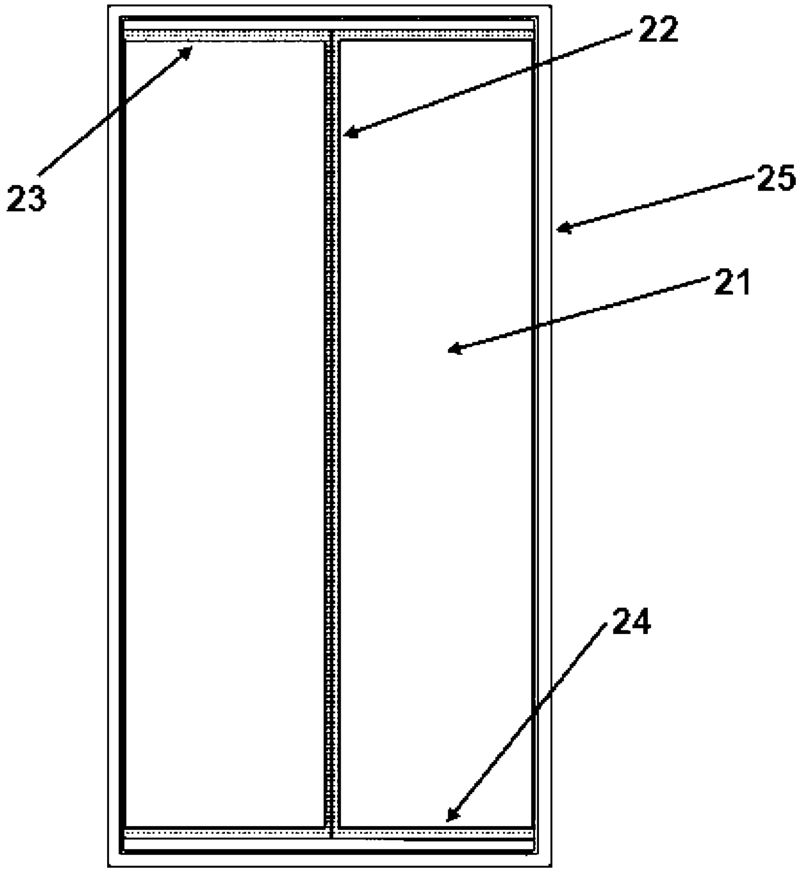
FIG. 3 is a plan view of a pane assembly wherein the polymer film has been perforated.

In some embodiments, the film comprising the pane is perforated to mitigate moisture condensation and to eliminate problems associated with the "bellows effect" which occurs when the sun heats the air between the layers of films. If there is a perfect seal, the expansion cause by the heat will pressurize the film. The microperforations equalize the pressure with the environment. In the specific embodiments used in the experiments reported herein, the perforations were created using a manual tool, illustratively a tool having size 21 satin pins each having a diameter of 0.021 inches. FIG. 3 shows a panel assembly 25 in which the film 21 has microperforations in a single line along the vertical centerline 22 and in a single line 23, 24 along both horizontal edges of the film resembling a sideways H-pattern.

The bellows effect can be mitigated by other techniques, such as drilling a small hole in the rigid frame of the pane assembly or by creating gaps in the adhesive used to bond the polymer film to the frame.

In order to have acceptable blast-resistance, the polymer film (or films) in the pane assembly or multiple pane assemblies must have a collective thickness of greater than 20 mils, and preferably at least 24 mils as demonstrated in the experiments presented herein. However, it is anticipated that the collective film thickness could be as high as 50 to 60 mils, or more. In blast-resistant embodiments, retrofit window insulation systems comprising multiple films provide greater cut resistance, while thicker films increase the strength of the pane.

In some embodiments, the retrofit window insulation system 10 of the present invention comprises a single pane assembly or multiple stacked pane assemblies of the type shown in FIG. 1. In other embodiments, the pane assembly or assemblies are held in a casing structure.

Figure 2:
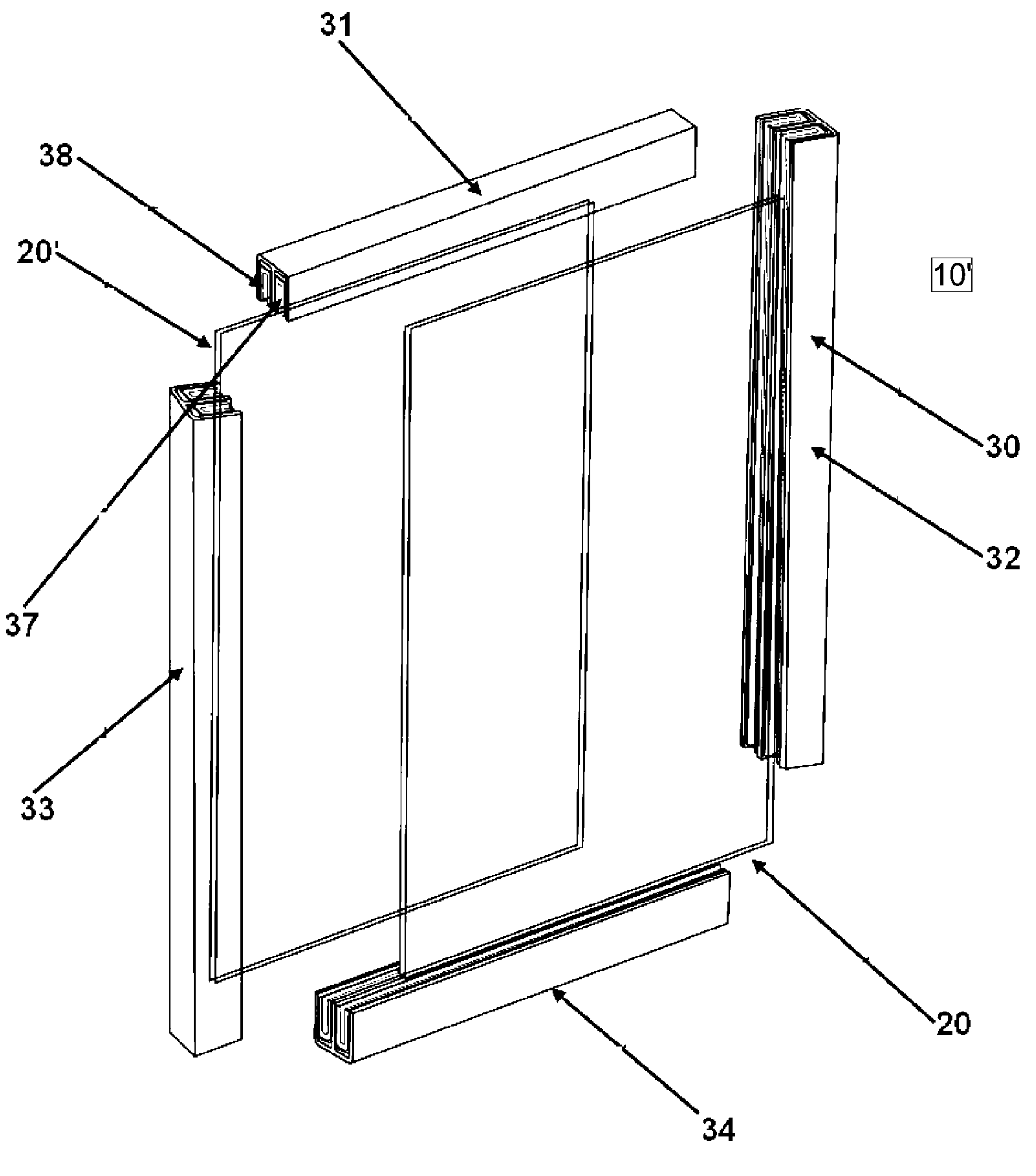
FIG. 2 is an exploded view of the retrofit window insulation system.

FIG. 2 is a fully exploded view of retrofit window insulation system 10' showing two pane assemblies 20, 20' being installed in casing structure 30. Casing Structure 30 comprises a horizontal header 31 (top), two vertical supports 32 and 33, and a horizontal support 34 (bottom) which form, in this case, a rectangular structure which supports the pane assemblies 20, 20'. The interior surfaces of the aforementioned elements comprising the casing structure 30 have grooves 37 and 38 configured to receive the two pane assemblies. These grooves are shown more clearly in FIG. 5. Of course, a retrofit window insulation system 10' that is configured to hold more than two pane assemblies would have additional grooves.

Figure 5:
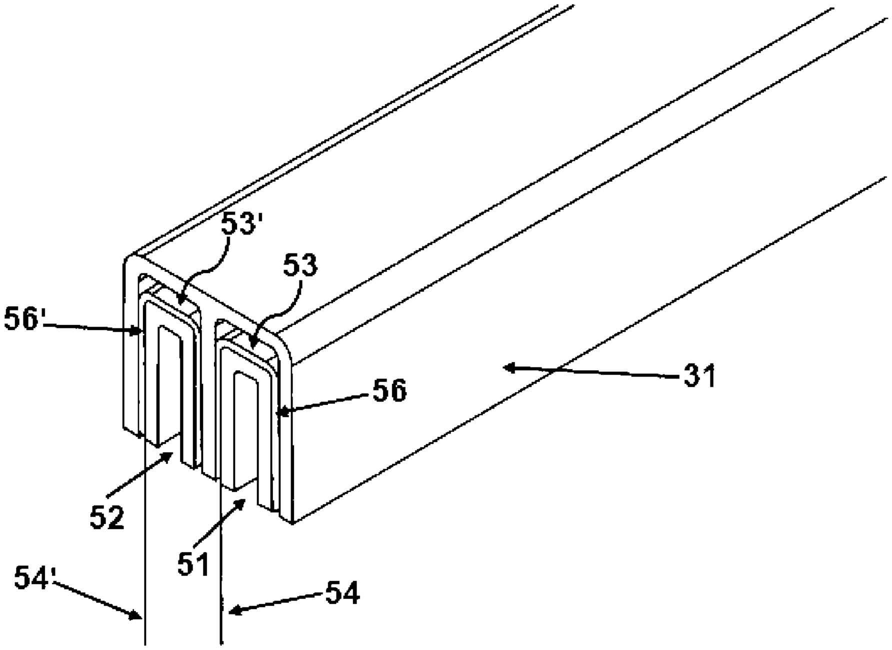
FIG. 5 is a perspective view of the profile of an extruded polymer header of a casing configured to hold pane assemblies in accordance with the present invention.

FIG. 5 is a perspective view of the profile of top support 31 on FIG. 2. Top support, or header, 31 has generally U-shaped grooves 51 and 52 that are dimensioned to receive the pane assemblies. Of course, the profile of the bottom support mirrors the top support. The side supports are similarly configured. In this embodiment, casing 30 is configured to hold two pane assemblies (not shown), It is to be understood, however, that the casing can be configured to hold more than two pane assemblies.

Referring to FIG. 5, rigid frame profile sections 53, 53', which may be pultruded fiberglass, are U-shaped and fit within grooves 51 and 52. For purposes of illustration, polymer films 54, 54' are shown attached to the exterior surface of one of the legs of the U-shaped frame profile sections 53, 53'.

Optionally, a spacer (not shown in this figure), such as a commercially available insulating foam sealant or wood blocks, for example, can be used to separate pane assemblies to form air gaps. Although not shown clearly in this figure, a gasket 16 can be used to create a seal around the perimeter of the frame of the pane assembly where it contacts casing structure 30. In this case, for example, a thin open cell foam 56, 56' was wrapped over the rigid frame prior to inserting same in the casing to form a breathable seal. Of course, a gasket can be used around the perimeter of the casing 30 to create a seal between the casing and the window frame or other element of building structure.

A retrofit window insulation system having a single pane assembly when applied against single pane glazing provides thermal insulation with an R-4.5 value. The double pane assembly shown in FIG. 2 provides a thermal insulation value of R-7. Of course, it is possible to add more pane assemblies to the retrofit window insulation system of the present invention to achieve R values ranging as high as R-13 for a 4 pane assembly. In some embodiments, the pane assemblies 20, 20' shown in FIG. 2 have polymer films on both sides of the rigid frame.

Figure 4:
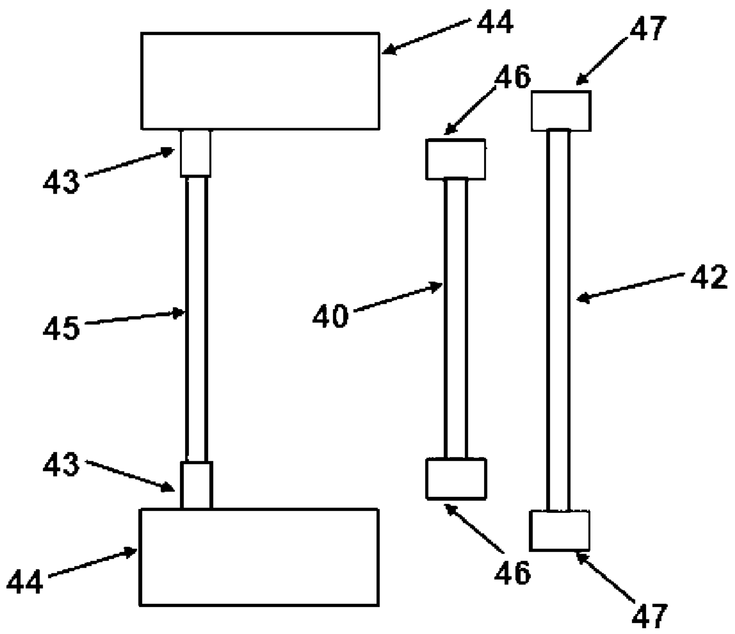
FIG. 4 is a schematic representation of two installation options for attaching the retrofit window insulation system of the present invention to the interior side of an existing window structure or to the building wall surrounding the existing window.

The retrofit window insulation system of the present invention is custom fit to the interior side of the existing window frame or, in alternate embodiments, to the wall surrounding the existing window frame. FIG. 4 is a schematic representation showing a retrofit window insulation system 40 which is sized to attach to the interior surface of a pre-existing window frame 43 and a retrofit window insulation system 42 which is sized to attach to the surface of the wall 44 in which the pre-existing window frame 43 is installed. In this particular example, the existing windowpane 45 is glass. Casing 46, 47 of the retrofit window insulation systems 40, 42 can, of course, be attached to the pre-existing structure by a variety of known means. It is also to be understood, that the retrofit window insulation system can be attached to the exterior surface of a pre-existing window frame in some embodiments. However, in the present blast-resistant embodiments, the retrofit window insulation system is mounted on the interior to capture secondary debris from the pre-existing window unit.

In one useful embodiment, the retrofit system is releasably fastened to the window frame with hook and loop-type fasteners, such as 3M or VELCRO® brand hook and loop fasteners, or interlocking mushroom-shaped head type fasteners, such as 3M brand Dual Lock™ reclosable fasteners. The reclosable fastener is attached to the window frame of the building with a pressure sensitive adhesive. In the specific embodiment employed in the experiments herein, a strip of 3M brand Dual Lock™ SJ3781 Type 250 (250 stems per square inch) was used on an aluminum window frame and a strip of SJ3751 Type 400 (400 stems per square inch) was applied to the casing structure. The properties related to the 3M brand Dual Lock™ System are available through 3M Technical Data Sheets for the product, and include a cleavage strength of 56 N/cm width with an initial disengagement force of 41.4 N/cm. However, in preferred embodiments for blast resistance, bolts are preferred.

Figure 6:
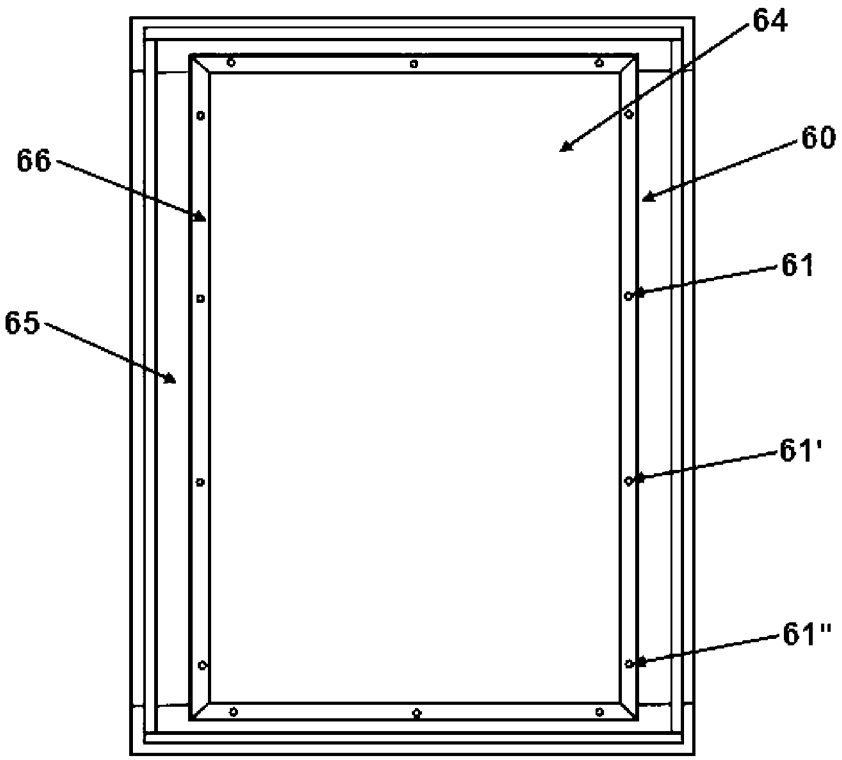
FIG. 6 is a front plan view of a retrofit window insulation system installed on a frame with bolts.

In the specific embodiment described herein, the retrofit window insulation system was attached to an aluminum window frame or fastened to a steel frame, representing the wall supporting an aluminum window unit, as illustrated in FIG. 4. In the experiments presented below, the retrofit window insulation system was bolted to a steel reaction test frame at fourteen locations using ¼-in. diameter bolts. FIG. 6 is a front plan view of an retrofit window insulation system installed on the interior window frame with bolts. More specifically, pane assembly 60, comprising polymer film 64 in rigid frame 66 is secured to window frame 65 with bolts (61, 61', 61", etc.). It is to be understood that this is a specific illustrative embodiment for fastening the retrofit window insulation system and was devised in connection with the experiments described herein. Persons of skill in the art would be able to devise other suitable means of attaching the retrofit window insulation system to an existing window.

In some of the experimental set-ups described herein, the retrofit window insulation system was secured to the test frame with a releasable fastener and a bolted wood bracket. In this case, wooden brackets constructed out of plywood blocks provide additional support to the retrofit unit. The brackets were bolted to the steel reaction test frame using ¼-in.-diameter bolts and extend across the ABS casing structure of the retrofit unit at six locations, i.e., two brackets on each side and one bracket on top and bottom. The wooden brackets do not need to be physically attached to the casing structure.

II. Experimental Section

The U.S. Army Engineer Research and Development Center (ERDC) conducted ten experiments in a compressed-gas driven Blast Load Simulator (BLS) at its Vicksburg, MS facility to evaluate the physical response of the retrofit window insulation system of the present invention when installed on a standard insulated glass window. Each version of the retrofit window insulation system was subjected to two simulated high explosive loads at threat levels of interest to ascertain whether the system would create any additional secondary debris hazards to the building occupants.

The compressed gas driven BLS is designed to simulate blast waveforms for explosive yields up to an equivalent of 50,000 lbs. of TNT at a peak reflected pressure up to 100 psi and a peak reflected impulse up to 1,100 psi-msec. This system is described more completely in an information paper by ERDC dated 2008 by Johnson and Simmons entitled "Blast Load Simulator/Shock Tube Testing Facilities in the United States." The BLS, which is used to evaluate the dynamic response of windows, walls, structural retrofit systems, and related targets, can simulate blast waveforms from very low pressures (2-3 psi) related to traumatic brain injuries to much higher pressures (max 100 psi) representative of very large truck bombs. The BLS has a control room that allows spectators to witness experiments firsthand with immediate feedback from high-speed videos and data acquisition systems.

The BLS includes a target vessel which is an enclosed 16-ft. long steel structure with a framed opening in the face to mount targets and an access door in the rear. All of the debris generated from a test article is contained in the target vessel. The samples to be tested are installed in a steel test frame housed in the front face of a target vessel. High-speed cameras mounted on the exterior of the target vessel capture high resolution videos through portals.

Witness panels were constructed from 40-in. by 48-in.× 2-in. thick honeycomb cardboard pads of the type typically used for blocking, bracing, or layering between materials on shipping pallets. The lightweight cardboard pads, while easy to cut, are strong enough to hold 2,500 lbs and were used in the experiments reported herein to document the effect of impacts from glass fragments and any debris from the test unit on an occupant, for example. The witness panels were installed between steel stiffeners on the back wall of the target vessel 15 ft. away from the interior surface of the window unit being tested.

In the experiments, the baseline was generated using a typical building window with an aluminum frame holding a ¾-in. thick insulated glass unit (IGU). The IGU as used in the conduct of the experiments herein is commercially-available from Trulite Glass & Aluminum Solutions, LLC, Peachtree City, GA and has two lites of annealed glass separated by a spacer, filled with a desiccant, and sealed with polyisobutylene (PIB) as the primary sealant and silicone as the secondary sealant. The annealed glass lites had been thermally treated and then slowly cooled to relieve any internal stresses. Annealed glass, as demonstrated in the baseline experiments reported here, tend to break into long, jagged shards that can cause significant injury.

In this specific instance, the IGU was 36¾-in. wide by 58¾-in. tall weighing approximately 49 lbs. and was constructed using two ⅛-in. annealed glass panes with a ½-in. air space separating the two panes. The annealed glass panes were held in an aluminum window frame which was nominally 4.5-in. wide by 2-in. deep by ⅛-in. thick with a 1⅜-in. channel to accommodate the IGU. The aluminum frame weighed 19 lbs. The glass was positioned in the aluminum reaction frame of the BLS with a ½-in. glass bite with a dry (no silicone) gasket. The IGU, consisting of the two glass panes, the gaskets, and the aluminum frame, weighed nominally 71 lbs. and was 40-in. wide by 62-in. tall. The reaction frame was mounted so that the bottom of the window frame was approximately 10-in. from the floor of the target vessel.

The retrofit window insulation system used in the experiments were described above in Section I. The specifics of the pane assembly is shown in column 2 of Table 1 below.

The following table summarizes the experimental design of the retrofit window insulation system tests. The average reflected pressure and impulse measured for Threat Level A was 13.6 psi and 59.5 psi-msec, respectively. For Threat Level B, the average reflected pressure and impulse measured was 23 psi and 73.7 psi-msec, respectively.

TABLE 1

| | WEMS Unit | | | Results |
|---|---|---|---|---|
| Experiment | Description of Pane | Connection to Window Frame | Threat Level | (Pass/Fail) |
| Window 1 | None | NA | A | NA |
| Window 2 | 2 layers of 10 mil perforated TPU | 3M Dual Lock ™ reclosable fastener (aluminum IGU) | A | FAIL |
| Window 3 | 2 layers of 2 mil unperforated TPU | 3M Dual Lock ™ reclosable fastener (aluminum IGU) | A | FAIL |
| Window 4 | 2 layers of 10 mil unperforated TPU | Bolted (steel reaction frame) | A | PASS |
| Window 5 | 2 layers of 10 mil unperforated TPU | Bolted (steel reaction frame) | B | FAIL |
| Window 6 | 4 layers of 2 mil unperforated TPU | Bolted(steel reaction frame) | B | FAIL |
| Window 7 | 2 layers of 10 mil & 2 layers of 2 mil unperforated TPU | Bolted (steel reaction frame) | B | PASS |
| Window 8 | None | NA | B | NA |
| Window 9 | 2 layers of 10 mil unperforated TPU | Bolted Wood Brackets (steel reaction frame) and 3M Dual Lock ™ reclosable fastener (aluminum IGU) | A | FAIL |
| Window 10 | 2 layers of 10 mil unperforated ETFE | Bolted (steel reaction frame) | A | FAIL |

The baseline experiments (Windows 1 and 8) were used to document the debris generated from the window and aluminum frame (IGU) and will be used as a comparison for all of the remaining experiments conducted at Threat Levels A and B, respectively.

In the baseline experiments, the annealed glass panes failed, breaking into very large shards of glass. However, the aluminum window frame remained in the steel test frame. The response from the experiment was defined as a high secondary debris hazard with fragments traveling an estimated 64-ft./sec or 44 mi/hour over the first 3.5 ft. The glass was scattered across the floor from the installation point to the back wall of the target vessel. The larger concentration of glass fragments on the floor and on the steel stiffeners indicated that most of the glass impacted the rear wall of the target vessel 15-ft. away. The witness panels were riddled with fragments. In experiment 8, the self-tapping screws used to secure the aluminum frame to the target vessel failed, which allowed the aluminum frame to become part of the debris field. The average velocity of the glass fragments in Experiment 8 was 94 ft./sec at the 3-ft. mark. The higher reflected pressure and impulse from the higher Threat B caused a 30 ft./sec increase in the velocity of the glass fragments.

The specific construction of the retrofit window insulation system units under test are described more particularly in column 2 in Table 1 above. All of the retrofit window insulation system units consist of a single pane in a rigid frame installed in a casing and are connected to the window frame of an IGU as described in column 3 of Table 1. For example, Window 2 was a retrofit window insulation system consisting of a single pane of 2 layers of 10-mil TPU in a pultruded fiberglass frame that was installed in an extruded ABS plastic casing. In this instance, the TPU film was provided with perforations in a single line along the vertical centerline and a single line along both horizontal edges of the film resembling a sideways H-pattern as shown in FIG. 3. The perforations were created using a manual tool with size 21 satin pins having a diameter of 0.021 in. The unit weighed 23.5 lbs. and was 40-in. wide by 62-in. tall. The unit casing was attached to the aluminum window frame of the IGU via the 3M Dual Lock™ materials applied to the perimeter of the aluminum frame as well as the perimeter of the ABS casing as discussed above. A rubber mallet was used to ensure a secure attachment of the casing structure to the aluminum frame. There was a 1⅞-in. air gap between the IGU and the casing structure.

In Window 3 on Table 1, the retrofit window insulation system consisted of two 2-mil layers of TPU in a pane assembly with a pultruded fiberglass frame that was installed in an extruded ABS plastic casing. The retrofit window insulation system was attached to the aluminum window frame using the same materials and application techniques used on Window 2.

Referring to column 2, the retrofit window insulation system of Window 4 consisted of two layers of 10-mil TPU in a pane assembly with an ABS casing structure. However, in this case, the window assembly was bolted to the steel reaction frame using fourteen ¼-in.-diameter bolts. The steel reaction frame was threaded to accept the bolts. The gap between the glass panes in the IGU and the retrofit window insulation system unit was increased to 2⅝ in. when it was bolted to the steel frame.

In this manner, a reading of Table 1 gives a description of the test units. In Window 9, the retrofit window insulation system was secured to the test frame with releasable fasteners and bolted wood brackets. In this case, wooden brackets constructed out of plywood blocks, provide additional support to the retrofit unit. The brackets were bolted to the steel reaction test frame of the window using ¼-in.-diameter bolts and extend across the ABS casing structure of the retrofit unit at six locations, i.e., two brackets on each side and one bracket on top and bottom. The wooden brackets were not physically attached to the casing structure.

Figure 7:
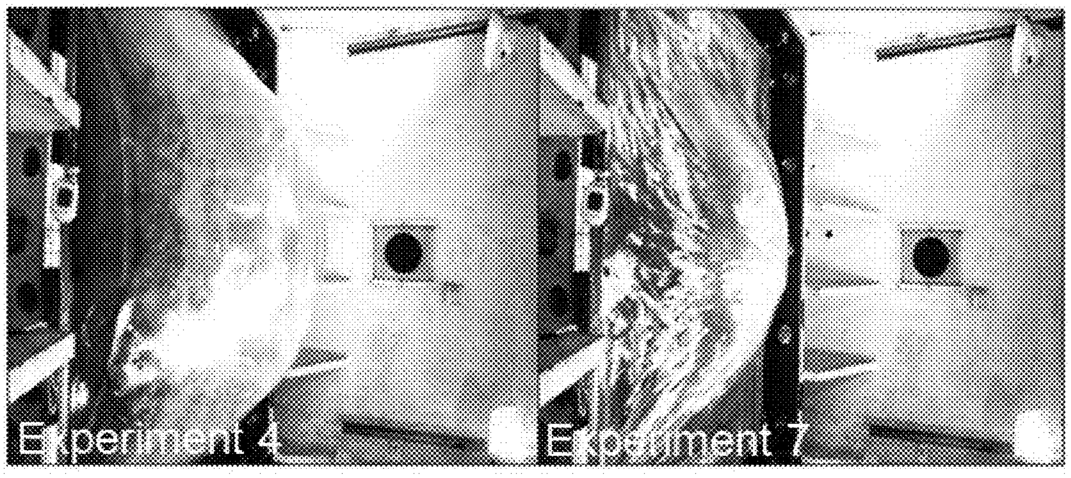
FIG. 7 is a high-speed photograph of the retrofit window insulation system units of Experiments 4 and 7 taken after a blast at Threat Level A and Threat Level B, respectively.

The objective of the experiments reported herein was to determine if an IGU retrofitted for energy conservation purposes with a WEMS™ unit would result in additional secondary debris hazards to occupants in the retrofitted facility. The results are shown in Table 1 above. The phrase "do no additional harm" relates directly to new debris or fragments generated from the components of the unit, i.e., TPU or ETFE panes, ABS or stainless-steel casing, or any connection materials for attaching the WEMS™ unit to the IGU frame or wall surround, being propelled into the target vessel by the high energy pressure wave. If any components of the unit became debris, then the experimental result was listed as "FAIL" in Table 1. If none of the components of the unit became debris, then the experiment was listed as "PASS." It is not surprising that annealed glass panes of the IGU would fail due to dynamic loading as seen in the two baseline experiments. It was anticipated that the experimental units would not become an additional debris hazard. However, it was discovered that only those units in which the polymer film or films that had a collective thickness of greater than 20 mils, and preferably at least 24 mils, and were secured to the stainless-steel test frame with bolts resulted in a PASS. The units that passed (Experiments 4 and 7) acted as a net to contain the debris from components of the units giving the appearance of a bubble as shown FIG. 7.

Based on the "do no additional harm" pass or fail criteria, the retrofit units in Experiments 2, 3, 5, 6, and 9 were unacceptable. In Experiments 2, 3, and 9, the entire unit detached and became a secondary piece of debris. All three of these experiments used the 3M™ releasable fastener product on the aluminum frame of the IGU and on the ABS casing structure. The 3M™ product was never evaluated when applied to the steel reaction frame and the ABS casing structure. In Experiment 9, wooden brackets were added in addition to the 3M Dual Lock™ reclosable fastener, but the casing structure still detached making the WEMS™ unit a debris hazard.

In Experiment 2, the polymer film was perforated. If the WEMS™ casing structure had remained in place, and the film split along the pre-installed microperforation lines or simply tore but remained attached to the casing structure, the system would have been considered to pass the "do no additional harm" requirement. In this case, glass debris could penetrate through the TPU or ETFE panes provided that the panes and casing structure remained at the installation point and would not become debris. However, the microperforations used in the TPU pane of Experiment 2 were not fully evaluated for blast resistance because the support conditions failed 5 msec after the pressure impacted the window, and the micro perforations were never engaged.

After Experiment 3, the 3M™ Dual Lock™ reclosable fasteners were replaced with bolts. The casing structure did not become a piece of debris once the support conditions were changed to a bolted connection to the steel reaction frame. In Experiments 5 and 6, the TPU film tore out and became a secondary debris hazard, but the casing structures bolted to the steel reaction frame remained in place. The cumulative thickness of the four layers of TPU film used in Experiment 6 was only 8 mils. This was one of the thinnest configurations used, and the system was evaluated at the higher Threat Level B. It is believed that the film was too thin for this larger threat, and the center of the film punched out under the combined loading of the pressure and weight of the glass fragments. The cumulative thickness of the polymer films in the WEMS™ unit used in Experiment 5 was 20 mils. However, this unit was evaluated at Threat Level B. The TPU film in Experiment 5 tore along the perimeter of the unit instead of punching out the center as observed in Experiment 6.

The response of the WEMS™ unit used in Experiment 10 was listed as a failure because the bolts securing the stainless-steel frame of the unit to the reaction structure failed making the bolt heads and washers new debris hazards. Because the bolts were added as part of the connection procedure for installing the retrofit unit, the overall system was classified as a fail. The use of stronger bolts might have resulted in a pass. The panes or casing structure components on the WEMS™ unit itself did not create an additional debris hazard. The failure may have been a result of the connection between the aluminum frame on the IGU and the aluminum plates on the test frame since this same effect was observed in baseline Experiment 8 where all of the self-tapping screws that connected the aluminum IGU frame to the aluminum plates in the test frame failed. In Experiment 10, the debris (bolts, washers) was only created on the side corresponding to the aluminum frame failure. The WEMS™ unit used in Experiment 10 contained ETFE panes with a cumulative thickness of 20 mils and was conducted at Threat Level A.

The WEMS™ units used in Experiments 4 and 7 completely passed the "do no additional harm" failure criteria. In these embodiments, the casing structure of the WEMS™ unit was bolted to the steel reaction frame. None of the components became a secondary debris hazard. The WEMS™ unit used in Experiment 4 contained TPU panes with a cumulative thickness of 20 mils and was evaluated at Threat Level A. The WEMS™ unit used in Experiment 7 had the largest cumulative thickness of 24 mils and was the only system that survived the larger Threat Level B.

The WEMS™ units used in Experiments 4 and 7 prevented most of the glass fragments from entering the target vessel and demonstrated an ability to mitigate the secondary debris hazards associated with a blast event. Preliminary evaluation of a hazard rating for the units of Experiments of 4 and 7 according to the hazard specifications of ASTM F2912, which is the standard specification for glazing and glazing systems subject to airblast loadings, was a very low hazard, H3, for Threat Level A and Threat B, respectively.

Although the invention has been described in terms of specific embodiments and applications, persons skilled in the art can, in light of this teaching, generate additional embodiments without exceeding the scope or departing from the spirit of the invention herein described. Accordingly, it is to be understood that the drawing and description in this disclosure are proffered to facilitate comprehension of the invention, and should not be construed to limit the scope thereof. Moreover, the technical effects and technical problems in the specification are exemplary and are not limiting. The embodiments described in the specification may have other technical effects and can solve other technical problems.

The invention claimed is:

1. A retrofit window insulation system for an existing window frame comprising:

at least one pane assembly, said at least one pane assembly consisting of a rigid frame structure having a front surface and a back surface and at least one low-e coated polymer film bonded to at least one of the front surface or the back surface of the rigid frame structure, each of the at least one polymer film having a thickness in the range of 2 to 20 mils.

2. The retrofit window insulation system of claim 1 further comprising a a casing structure, said casing structure being configured to hold one or more of said pane assemblies and to be attachable to an existing window frame or a surrounding wall.

3. The retrofit window insulation system of claim 2 wherein said casing structure is selected from the group consisting of a high strength polymer and stainless steel.

4. The retrofit window insulation system of claim 2 wherein said casing structure further includes elements of a decorative or a functional nature selected from the group consisting of shades and louvers.

5. The retrofit window insulation system of claim 1 wherein the rigid frame structure is pultruded fiberglass.

6. The retrofit window insulation system of claim 1 wherein the rigid frame structures is stainless steel.

7. The retrofit window insulation system of claim 6 wherein the stainless steel is roll-formed stainless steel.

8. The retrofit window insulation system of claim 1 wherein the low-e coated polymer film is bonded to the front surface of the rigid frame structure and a second low-e coated polymer film bonded to the back surface of the rigid frame structure.

9. The retrofit window insulation system of claim 1 wherein the polymer comprising the substrate for the deposition of the low-e coating is selected from the group comprising thermoplastic polyurethane and a copolymer of ethylene and tetrafluoroethylene.

10. The retrofit window insulation system of claim 9 wherein said at least one low-e coated polymer film of said at least one pane assembly has a collective thickness of greater than 20 mils.

11. The retrofit window insulation system of claim 10 wherein said at least one low-e coated polymer film of said at least one pane assembly has a collective thickness of at least 24 mils.

12. The retrofit window insulation system of claim 1 wherein said at least one low-e coated polymer film has microperforations in a pattern for pressure equalization and to control a position of a tear in the at least one low-e coated polymer film.

13. The retrofit window insulation system of claim 12 wherein the pattern is a sideways H-pattern.

14. The retrofit window insulation system of claim 1 further including fasteners for attaching said pane assembly to the existing window frame or surrounding wall.

15. The retrofit window insulation system of claim 14 wherein said fasteners for attaching said pane assembly are releaseable fasteners.

16. The retrofit window insulation system of claim 15 wherein the releaseable fasteners are interlocking mushroom-shaped head fasteners.

17. The retrofit window insulation system of claim 14 wherein said fasteners for attaching said pane assembly are permanent fasteners.

18. The retrofit window insulation system of claim 17 wherein the permanent fasteners are stainless steel bolts.

19. The retrofit window insulation system of claim 1 wherein said at least one pane assembly is installed in a casing structure that is configured to hold one or more of said pane assemblies and further including fasteners for attaching the casing structure to the existing window frame or a surrounding wall.

20. A retrofit window insulation system for an existing window frame comprising at least one pane assembly, said at least one pane assembly consisting of a rigid frame structure, the rigid frame structure having a front surface and a back surface and a thickness (t) as measured between the front surface and the back surface;

a first low-e coated polymer film bonded to the front surface of the rigid frame structure, the first low-e coated polymer film having a thickness in the range of 2 to 20 mils; and a second low-e coated polymer film bonded to the back surface of the rigid frame structure so as to form an air gap between the first and second low-e coated films defined by the thickness (t) of the rigid frame structure, the second low-e coated polymer film having a thickness in the range of 2 to 20 mils.

21. The retrofit window insulation system of claim 20 wherein the air gap thickness is between about 19 mm to 23 mm.

* * * * *